UNITED STATES PATENT OFFICE 2,507,754

POLYAZO DYESTUFFS

Werner Bossard, Riehen, and Ernst Keller, Basel, Switzerland, assignors to J. R. Geigy A. G., Basel, Switzerland No Drawing. Application February 10, 1947, Serial No. 727,722. In Switzerland August 2, 1946

5 Claims. (Cl. 260—168)

The present invention refers to a process for the production of copperable polyazo dyestuffs being suitable for dyeing cellulosic fibres in fast shades. More particularly this invention relates to the production of copperable tris- and tetrakisazo dyestuffs dyeing cellulosic fibres in violet-blue, navy-blue, grey-blue and black-grey shades of very good fastness properties.

Beside the expensive vat dyestuffs satisfying the highest requirements recently the substantive, metallisable polyazo dyestuffs, whose light-fastness properties can be improved by an after-treatment with copper salts and which can be stabilised on the fibre, have become more and more important because of their simple application method and their low costs. In order to enable the said substantive, metallisable polyazo dyestuffs to compete with the vat dyestuffs possessing excellent fastness properties in the moist state, the metallised dyeings of polyazo dyestuffs must satisfy the highest requirements of modern technics particularly with respect to the fastness-properties in the moist state. It seems that small improvements often will decide the utility of such polyazo dyestuff for a determinate purpose. It is important for the base material which has to be cleaned and washed that the dyeing produced thereon is particularly fast to water and to washing and also to light; besides the dyeing must be fast to alkali, to acid and to perspiration. It must be noted that especially for the washing fastness the smallest improvements are of most important value. In practice it has been observed that the prior valuation methods for the washing-fastness of polyazo dyestuffs are no more satisfactory. Therefore, the "fastness to severe washing" or the "fastness to repeated soap washing," which latter is still more fit to the practical destination, have been introduced.

The present invention relates to the production of new tris- and tetrakisazo dyestuffs which are capable of being coppered and produce violet-blue, navy-blue, grey-blue and black-grey coppered dyeings of high light-fastness properties and of excellent water- and washing-fastness properties, which dyeings are furthermore particularly distinguished by an excellent "fastness to repeated soap-washing," so that the same are particularly suitable for the dyeing of cellulosic fibres to be used for the production of the base material.

In our co-pending patent application Ser. No. 515,022, now Patent No. 2,417,306, issued March 11, 1947, blue to black tris- and tetrakisazo dyestuffs are disclosed which are distinguished by excellent fastness properties in the moist state of dyeings produced on cellulosic materials, if such dyeings have been after-treated with copper salts. The dyestuffs disclosed in the said U. S. patent application are capable of being coppered. They will be obtained by coupling tetrazotised 4:4' - diamino - 3:3' - dialkoxydiphenyl with one molecule of a monoazo dyestuff obtainable by coupling in an acid medium diazotised anthranilic acid with 2-amino-5-hydroxynaphthalene-7-sulfonic acid and with a further molecule of the identical or different monoazo dyestuff or a monoazo dyestuff of analogous constitution or with one molecule of a hydroxynaphthalene compound coupling in ortho-position to the hydroxyl group or with one molecule of an aromatic ortho-hydroxycarboxylic acid of the benzene and naphthalene series coupling in para-position to the hydroxyl group. In view of the very valuable fastness properties of the new dyestsuffs of the present invention it would be desirable to extend the color scale of the shades reached therewith.

It has now been found that tris- and tetrakisazo dyestuffs of similar constitution and of likewise excellent fastness properties can be obtained according to the present invention, the new dyestuffs being distinguished by a valuable shift of the shade towards redder shades so that the production of fast, violet-blue, navy-blue, grey-blue and black-grey shades can be obtained. The new dyestuffs of the present invention are obtained by combining a tetrazotised diamine of the general formula I 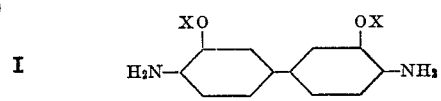

wherein X means $CH_3$—, $C_2H_5$— and $HOOC—CH_2$— in any order of succession of the reaction sequences on the one hand with one molecule of an acid coupled monoazo dyestuff obtainable from a diazotised anthranilic acid and a 2-amino-5-hydroxynaphthalene-7-sulfonic acid and corresponding to the general formula II 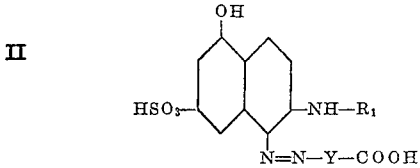

wherein $R_1$ means an alkyl, cycloalkyl, aralkyl or aryl group of the benzene series and Y means a radical of the benzene series containing the carboxy group in ortho-position to the azo group, and on the other hand with a coupling component A—H, the definition of which will be given in details below.

The method for producing the new dyestuffs capable of being coppered is thus characterized by the fact that at least once there will be used an amino azo dyestuff made by coupling in an acid medium an o-carboxybenzene-diazonium compound with a 2-amino-5-hydroxynaphthalene-7-sulfonic acid substituted according to the definition at the nitrogen atom. The said dyestuff can readily be obtained by coupling in an acid medium diazotised anthranilic acid or diazo compounds of substitution products thereof with 2-amino-5-hydroxynaphthalene-7-sulfonic acid substituted according to the definition in the amino group. As substituents falling within the scope of $R_1$ of the above formula may be used alkyl groups, such as methyl, carboxymethyl, ethyl, chlorethyl, propyl, butyl, hexyl, undecyl and the like; cycloalkyl groups, such for example as cyclopentyl, cyclohexyl, cycloheptyl groups, lower alkyl groups being preferred because of the decreasing affinity with increasing molecular weight of the substituent; then aralkyl groups, such as the benzyl group and homologous and substituted benzyl groups, aromatic groups of the benzene series, such as the phenyl group as well as homologous and substituted phenyl groups. As stated the said hydrocarbon radicals can be substituted by atoms and groupings usual in azo dyestuffs, for example by halogen, hydroxyl, alkoxy, amino, acylamino, carboxyl, sulfonic acid groups and so on. The dyestuffs possessing an amino group substituted by an aromatic substituent are particularly valuable, for the same are distinctly superior to the dyestuffs of the copending patent application Ser. No. 515,022 with respect to the light-fastness properties, this depending on the constitution of the new dyestuffs.

As coupling component A—H use may be made of aromatic compounds being capable of coupling and of introducing a metallisable group into the dyestuffs, or aromatic compounds which in combination with the resulting o'-alkoxy azo group will impart a metallisable group to the polyazo dyestuff; or such aromatic compounds can be used, which comply with both the said conditions. Coupling components introducing metallisable groups are for instance the aromatic o-hydroxycarboxylic acids coupling in para-position to the hydroxyl group, such as salicylic acid, m-cresotic acid, 1-hydroxy-naphthalene-2-carboxylic acid. Coupling components yielding a metallisable group in combination with the o'-alkoxyazo group are for example such compounds which are capable of being coupled in ortho-position to a metallisable group; among such compounds the hydroxy-naphthalene compounds coupling in ortho-position to the hydroxyl group are of particular importance. Among the term "hydroxynaphthalene compounds coupling in ortho-position to the hydroxyl group" the following groups of compounds may be comprised in the present specification and claims: naphthols coupling in ortho-position to the hydroxyl group, such as 1-hydroxy-5-chloronaphthalene, 1:5-dihydroxynaphthalene, 2-hydroxy-6-methoxynaphthalene, amino-naphthols coupling in ortho-position to the hydroxyl group, such for instance as 1:7-aminonaphthol, 2:7-aminonaphthol and derivatives thereof being acylated at the nitrogen atom, hydroxynaphthalene sulfonic acids coupling in ortho-position to the hydroxyl group, such as 1:4-naphthol sulfonic acid, 1:5-naphthol sulfonic acid, 2:6-naphthol sulfonic acid, aminonaphthol sulfonic acids coupling in ortho-position to the hydroxyl group and derivatives thereof substituted and acylated at the nitrogen atom, such as for instance 2-amino-5-hydroxynaphthalene-7-sulfonic acid, 2-amino-8-hydroxynaphthalene-6-sulfonic acid, 1-amino-5-hydroxynaphthalene-7-sulfonic acid, 1-amino-8-hydroxynaphthalene-4-sulfonic acid and -2:4-disulfonic acid as well as derivatives thereof substituted or acylated at the nitrogen atom, e. g. the acylated or benzoylated derivatives. As coupling components which simultaneously introduce and produce a metallisable group may be mentioned for instance 2:4-dihydroxybenzoic acid, 2-(4'-hydroxy-3'-carboxyphenylamino)-5-hydroxynaphthalene-7-sulfonic acid and the like. A further group of coupling components A—H which couple in the ortho-position to the hydroxy group in the naphthalene nucleus and which may be used according to the present invention includes the monoazo dyestuffs of the general formula

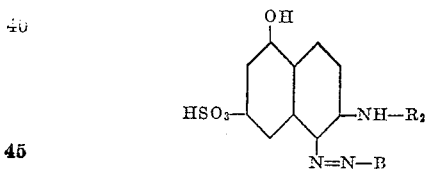

wherein $R_2$ means hydrogen, alkyl, cycloalkyl, aralkyl or aryl group of the benzene series and B means an aryl radical of the benzene series. In some cases the radical B can bear a carboxy group present in ortho-position to the azo group and the coupling component A—H can be identical with the monoazo dyestuff of the above general Formula II.

As already mentioned, the order of succession of the coupling of the tetrazotised diamine of the general Formula I with the monoazo dyestuff of the general Formula II and with the coupling component A—H is of no importance. However, it is preferred to choose the operation sequence of coupling reactions according to the coupling energy of the components so that that coupling component, the coupling of which will take place less readily, will first be brought to reaction. Moreover, the dyestuff formation can be facilitated by known means by addition of adjuvants, such as pyridine.

As stated above, the new dyestuffs are either metallisable trisazo dyestuffs or symmetrical or unsymmetrical, metallisable tetrakisazo dyestuffs. The new dyestuffs are dark powders dissolving in water with a blue to violet coloration and dyeing cellulosic fibres, when after-coppered, in violet-blue to black-grey shades of excellent fastness properties.

The following examples illustrate the invention without however limiting the same. Parts by weight bear the same relation to parts by volume as do drams to cubic centimeters.

Example 1

24.4 parts of 4:4'-diamino-3:3'-dimethoxydiphenyl are tetrazotised in the usual way and added at 0–3° C. to a solution of 113.6 parts of the monoazo dyestuff made by coupling in an acid medium diazotised 5-nitro-2-aminobenzoic acid with 2-(4'-hydroxy-3'-carboxyphenylamino)-5-hydroxynaphthalene-7-sulfonic acid in 800 parts of water, 300 parts of pyridine and 15 parts of ammonia. The coupling being complete the tetrakisazo dystuff is precipitated by means of sodium chloride at 40–50° C., filtered and dried.

The dried dyestuff is a blue-black powder; it dissolves in water and concentrated sulfuric acid with a blue coloration and dyes cellulosic fibres in navy-blue shades. The after-coppered dyeings are distinguished by very good fastness properties to water, washing and light.

Further dyestuffs dyeing cellulosic fibres in navy-blue shades and possessing similar fastness properties will be obtained by using in this example, instead of 113.6 parts of the acid coupled monoazo dyestuff of 5-nitro-2-aminobenzoic-acid→2-(4'-hydroxy-3'-carboxyphenylamino)-5-hydroxynaphthalene-7-sulfonic acid, 101.6 parts of 5-nitro-2-aminobenzoic-acid→2-phenylamino-5-hydroxynaphthalene-7-sulfonic acid or 89.2 parts of 5-nitro-2-aminobenzoic acid→2-methylamino-5-hydroxynaphthalene-7-sulfonic acid or 92.0 parts of 5-nitro-2-aminobenzoic acid→2-ethylamino-5-hydroxynaphthalene-7-sulfonic acid or 95.5 parts of 5-nitro-2-aminobenzoic acid→2-$\beta$-hydroxyethylamino-5-hydroxynaphthalene-7-sulfonic acid or 98.9 parts of 5-nitro-2-aminobenzoic acid→2-$\beta$-chlorethylamino-5-hydroxynaphthalene-7-sulfonic acid or 95.0 parts of 5-nitro-2-aminobenzoic acid→2-$\beta$-aminoethyl-amino-5-hydroxynaphthalene-7-sulfonic acid or 100.4 parts of 5-nitro-2-aminobenzoic acid→2-isoamylamino-5-hydroxynaphthalene-7-sulfonic acid or 103 parts of 5-nitro-2-aminobenzoic acid→2-cyclohexylamino-5-hydroxy-naphthalene-7-sulfonic acid or 100.2 parts of 5-nitro-2-aminobenzoic acid→2-cyclopentylamino-5-hydroxynaphthalene-7-sulfonic acid or 104.4 parts of 5-nitro-2-aminobenzoic acid→2-benzylamino-5-hydroxynaphthalene-7-sulfonic acid, the method being exactly the same as that described in the above example.

Example 2

24.4 parts of 4:4'-diamino-3:3'-dimethoxydiphenyl are tetrazotised in the usual way and combined with 15.3 parts of salicylic acid and 30 parts of sodium carbonate. As soon as the formation of the intermediate product has completed, the same is allowed to run into a solution of 50.8 parts of a monoazo dyestuff made by coupling in an acid medium diazotised 5-nitro-2-aminobenzoic acid with 2-phenylamino-5-hydroxynaphthalene-7-sulfonic acid, the said solution containing 15 parts of sodium carbonate. The finished dyestuff is precipitated with sodium chloride, filtered and dried. It constitutes a dark powder dissolving in water with a violet coloration and in conc. sulfuric acid with a blue coloration. The new dyestuff dyes cellulosic fibres, when after-coppered, in reddish-black shades of excellent fastness-properties to washing and to light.

By replacing in the above example 50.8 parts of the monoazo dyestuff made by coupling in an acid medium 5-nitro-2-aminobenzoic acid with 2-phenylamino-5-hydroxynaphthalene-7-sulfonic acid by 56.8 parts of 5-nitro-2-aminobenzoic acid→2-(4'-hydroxy-3'-carboxyphenylamino)-5-hydroxynaphthalene-7-sulfonic acid or by 44.6 parts of 5-nitro-2-aminobenzoic acid→2-methylamino-5-hydroxynaphthalene-7-sulfonic or by 47.6 parts of 5-nitro-2-aminobenzoic acid→2-$\beta$-hydroxyethylamino-5-hydroxynaphthalene-7-sulfonic acid or by 49.5 parts of 5-nitro-2-aminobenzoic acid→2-$\beta$-chlorethylamino-5-hydroxynaphthalene-7-sulfonic acid or by 50.2 parts of 5-nitro-2-aminobenzoic acid→2-isoamylamino-5-hydroxynaphthalene-7-sulfonic acid or by replacing 15.3 parts of salicylic acid by 16.5 parts of o- or m-cresotic acid and otherwise working exactly in the same manner as disclosed in the above example further dyestuffs will be obtained which dye fibres from cotton and regenerated cellulose, when after-coppered, in reddish-black or black-brown shades of excellent fastness properties to washing and to light.

Example 3

24.4 parts of 4:4'-diamino-3:3'-dimethoxydiphenyl are tetrazotised and coupled on the one half side with 46.3 parts of the monoazo dyestuff obtainable by coupling in an acid medium 2-aminobenzoic acid with 2-phenylamino-5-hydroxynaphthalene-7-sulfonic acid, the coupling of the starting materials being carried out in the presence of an excess of sodium carbonate. The resultant intermediate product is then coupled with an aqueous solution of 14.4 parts of 2-hydroxy-naphthalene, 20 parts of sodium carbonate and 150 parts of pyridine being added to the said solution of 2-hydroxynaphthalene, which is caused to run into the solution containing the said intermediate product. After some hours also the second coupling is complete. Then the dyestuff is precipitated by addition of sodium chloride, filtered, washed with dilute brine and dried. The new dyestuff which is a dark powder dissolves in water and in conc. sulfuric acid with a blue coloration and dyes cellulosic fibres in reddish-blue shades which, when after-treated with a copper-yielding agent according to known methods, are only slightly changed in color, but are considerably improved with respect to their fastness properties in the moist state and to light.

By replacing in the above example 14.4 parts of 2-hydroxynaphthalene by 15.9 parts of 2:6- or 2:7-aminonaphthol, by 16.0 parts of 2:6- or 2:7-dihydroxynaphthalene, by 17.4 parts of 2-methoxy-6-hydroxynaphthalene, by 22.4 parts of 2-hydroxynaphthalene-4-, -6-, or -7-sulfonic acid, by 22.4 parts of 1-hydroxynaphthalene-4-sulfonic acid, by 23.9 parts of 2-amino-, 31.5 parts of 2-phenylamino-, 37.5 parts of 2-(4'-hydroxy-3'-carboxyphenylamino)- or by 34.3 parts of 2-benzoylamino-5-hydroxynaphthalene-7-sulfonic acid, by 34.3 parts of 2-benzoylamino-6-hydroxynaphthalene-8-sulfonic acid, by 31.5 parts of 2-phenylamino-8-hydroxynaphthalene-4-sulfonic acid, by 14.5 parts of 8-hydroxyquinoline or by 22.5 parts of 8-hydroxyquinoline-5-sulfonic acid and otherwise working according to the above prescription, there will be obtained dyestuffs of similar fastness properties dyeing cellulosic fibres in navy blue shades.

Example 4

24.4 parts of 4:4'-diamino-3:3'-dimethoxydiphenyl are tetrazotised and combined with a solution consisting of 43.6 parts of the monoazo dyestuff obtainable by coupling, in an acid medium, diazotised 5-chloro-2-aminobenzoic acid with 2-methylamino - 5 - hydroxynaphthalene - 7 - sulfonic acid and of 15 parts of sodium carbonate. After formation of the intermediate product the same is allowed to run into an aqueous solution of 22.4 parts of 2-hydroxynaphthalene-6-sulfonic acid and 20 parts of sodium carbonate. The coupling being complete, the trisazo dyestuff is precipitated by means of sodium chloride, filtered off and dried. The new dyestuff forms a dark powder dissolving in water as well as in conc. sulfuric acid with a blue coloration and dyeing fibres from natural or regenerated cellulose in reddish-blue shades. The after-coppered dyeings possess good fastness properties.

Similar dyestuffs having similar properties will be obtained, when using, instead of diazotised 5-chlor-2-aminobenzoic acid, diazotised 3-chloro-2-aminobenzoic acid, 3:6-dichloro-2-aminobenzoic acid, 5-nitro-2-aminobenzoic acid, 4-nitro-2-aminobenzoic acid, 3:5-dinitro-2-aminobenzoic acid, 5-acetylamino-2-aminobenzoic acid, 5-cyano-2-aminobenzoic acid, 2-aminobenzene-1:4-dicarboxylic acid, 2-aminobenzene-1:5-dicarboxylic acid, 5-sulfamino-2-aminobenzoic acid or 2-aminobenzene-1-carboxylic acid-5-sulfonic acid-phenylamide - 4' - hydroxy-3'-carboxylic acid together with 2-methylamino-5-hydroxynaphthalene-7-sulfonic acid for the formation of the monoazo dyestuff to be coupled in an acid medium, the further production of the trisazo dyestuffs being carried out in exactly the same manner as that disclosed in the above example.

*Example 5*

A tetrazonium chloride solution consisting of 24.4 parts of 4:4'-diamino-3:3'-dimethoxydiphenyl is allowed to run into an aqueous solution of 47.6 parts of the monoazo dyestuff from 5-nitro-2-aminobenzoic acid→2-β-hydroxyethylamino-5-hydroxynaphthalene-7-sulfonic acid (coupled in an acid medium) containing 15 parts of sodium carbonate. The intermediate product is rapidly formed. The same is combined with 43.2 parts of the monoazo dyestuff from 5-nitro-2-aminobenzoic acid→2-amino-5-hydroxynaphthalene-7-sulfonic acid in the presence of 20 parts of sodium carbonate and 150 parts of pyridine. The tetrakisazodyestuff is salted out at 40° C. by addition of sodium chloride, filtered off, washed with a dilute sodium chloride solution and dried. It constitutes a dark powder which dissolves in water with a blue coloration and in conc. sulfuric acid with a dirty violet coloration. When after-coppered, there results a navy-blue dyeing on cellulosic fibres which is distinguished by very good fastness properties to washing, to water and to light.

When using, instead of 43.2 parts of the monoazo dyestuff from 5-nitro-2-aminobenzoic acid→2-amino-5-hydroxynaphthalene-7-sulfonic acid, 50.8 parts of 5-nitro-2-aminobenzoic acid→2-phenylamino - 5 - hydroxynaphthalene - 7 - sulfonic acid or 53 parts of 5-nitro-2-aminobenzoic acid→2 - cyclohexylamino - 5 - hydroxynaphthalene-7-sulfonic acid or 56.8 parts of 5-nitro-2-aminobenzoic acid→2-(4'-hydroxy - 3' - carboxyphenylamino) - 5 - hydroxynaphthalene - 7 - sulfonic acid or 40.3 parts of 4-amino-1-hydroxybenzene-2-carboxylic acid→2 - amino-5-hydroxynaphthalene-7-sulfonic acid or 42.3 parts of 3-aminobenzene - 1 - sulfonic acid→2 - amino-5-hydroxynaphthalene-7-sulfonic acid or 49.9 parts of 3-aminobenzene-1-sulfonic acid→2-phenylamino-5-hydroxynaphthalene-7-sulfonic acid or 46.6 parts of 3-aminobenzene-1-sulfonic acid→2-β-aminoethylamino - 5 - hydroxynaphthalene - 7-sulfonic acid for the formation of the tetrakisazo dyestuff in accordance with the above prescription, there will be obtained similar dyestuffs dyeing cellulosic fibres, when after-coppered, also in navy-blue shades of very good fastness properties to washing, to water and to light.

*Example 6*

24.4 parts of 4:4'-diamino-3:3'-dimethoxydiphenyl are tetrazotised and combined in the presence of 20 parts of sodium carbonate with 50.8 parts of the monoazo dyestuff obtainable by coupling, in an acid medium, diazotised 5-nitro-2-aminobenzoic acid with 2-phenylamino-5-hydroxynaphthalene-7-sulfonic acid. As soon as the diazo disazo compound has been formed, 22.4 parts of 1-hydroxynaphthalene-4-sulfonic acid and 20 parts of sodium carbonate are poured thereinto. The mixture is stirred for some hours and then the new trisazo dyestuff is precipiated by addition of sodium chloride, filtered off and dried. It is a dark powder, which dissolves in water and concentrated sulfuric acid with a blue coloration and dyes fibres from cotton and regenerated cellulose in reddish navy-blue shades which, on after-coppering, are only immaterially changed in color, while the said shades possess excellent fastness properties to washing, water and to light.

Some further dyestuffs illustrating the objects of the present invention can be deduced from the following table. All these dyestuffs can be made according to the methods disclosed in the above examples, while using the various components shown in the said table:

*Table*

| tetrazo compound from— | acid coupled monoazo dyestuff from— | | Other coupling component | shade of the after-coppered dyeing |
|---|---|---|---|---|
| | o-carboxydiazonium compound | derivative of 2-amono-5-hydroxynaphthalene-7-sulfonic acid | | |
| 4:4'-diamino-3:3'-dimethoxydiphenyl. | 2-aminobenzoic acid | 2-(4'-hydroxy - 3'-carboxy-phenylamino)-5-hydroxynaphthalene-7-sulfonic acid. | 1:2-hydroxynaphthoic acid | navy-blue. |
| Do | 2-aminobenzoic acid-5-sulfonic acid. | 2-ethylamino-5-hydroxynaphthalene-7-sulfonic acid. | 3:5-dinitro-2-aminobenzoic acid→2-amino-5-hydroxynaphthalene-7-sulfonic acid (acid coupled). | Do. |
| Do | 5-nitro-2-aminobenzoic acid | 2-(4'-hydroxyphenylamino)-5-hydroxynaphthalene-7-sulfonic acid. | salicylic acid | black. |
| 4:4'-diamino-3:3'-dicarboxymethoxydiphenyl. | 2-aminobenzoic acid | 2-phenylamino-5-hydroxynaphthalene-7-sulfonic acid. | 5-acetylamino-2-aminobenzoic acid → 2-amino-5-hydroxynaphthalene-7-sulfonic acid (acid coupled). | navy-blue. |

Table—Continued

| tetrazo compound from— | acid coupled monoazo dyestuff from— | | Other coupling component | shade of the after-coppered dyeing |
|---|---|---|---|---|
| | o-carboxydiazonium compound | derivative of 2-amono-5-hydroxynaphthalene-7-sulfonic acid | | |
| 4:4'-diamino-3:3' dimethoxydiphenyl. | 5-nitro-2-aminobenzoic acid | 2-undecylamino-5-hydroxynaphthalene-7-sulfonic acid. | 2-phenylamino-5-hydroxynaphthalene-7-sulfonic acid. | Do. |
| Do | do | 2-phenylamino 5 hydroxynaphthalene-7-sulfonic acid. | 2-amino-1-hydroxybenzene-6-carboxylic acid-4-sulfonic acid → 2-amino-5-hydroxynaphthalene-7-sulfonic acid (acid coupled). | Do. |
| Do | 2-aminobenzoic acid-5-sulfonic acid amide. | 2-isoamylamino-5-hydroxynaphthalene-7-sulfonic acid. | 1-hydroxynaphthalene-4-sulfonic acid. | Do. |
| | 2-aminobenzene-1:4-dicarboxylic acid. | 2-(4'-acetylaminophenylamino)-5-hydroxynaphthalene-7-sulfonic acid. | 3-aminobenzene-sulfonic acid → 2-phenylamino-5-hydroxynaphthalene-7-sulfonic acid (acid coupled). | Do. |
| Do | 5-nitro-2-aminobenzoic acid | 2-(4'-hydroxy-3'-carboxyphenylamino)-5-hydroxynaphthalene-7-sulfonic acid. | 2-hydroxynaphthalene-6-sulfonic acid. | Do. |
| Do | 5-chloro-2-aminobenzoic acid | 2-ethylamino-5-hydroxynaphthalene-7-sulfonic acid. | 5-amino-2-hydroxybenzoic acid → 2-amino-5-hydroxynaphthalene-7-sulfonic acid (acid coupled). | Do. |
| Do | 2-aminobenzoic acid-5-sulfonic acid amide. | 2-isoamylamino-5-hydroxynaphthalene-7-sulfonic acid. | 2-aminobenzoic acid-5-sulfonic acidamide → 2-isoamylamino-5-hydroxynaphthalene-7,sulfonic acid (acid coupled). | Do. |
| 4:4'-diamino-3:3'-dicarboxymethoxydiphenyl. | 5-chloro-2-aminobenzoic acid | 2-β-methoxyethylamino-5-hydroxynaphthalene-7-sulfonic acid. | 2-amino-5-hydroxy-naphthalene-7-sulfonic acid. | Do. |
| 4:4'-diamino-3:3'-dimethoxydiphenyl. | 5-nitro-2-aminobenzoic acid | 2-β-hydroxyethylamino-5-hydroxynaphthalene-7-sulfonic acid. | 2-hydroxynaphthalene-6-sulfonic acid. | Do. |
| Do | do | 2-phenylamino-5-hydroxynaphthalene-7-sulfonic acid. | 1-hydroxy-naphthalene-2-carboxylic acid. | brown-black. |
| Do | 5-chloro-2-aminobenzoic acid | do | 5-chloro-2-aminobenzoic acid → 2-phenylamino-5-hydroxynaphthalene-7-sulfonic acid (acid coupled). | navy-blue. |
| Do | 5-acetylamino-2-aminobenzoic acid. | 2-(4'-hydroxy-3'-carboxyphenylamino)-5-hydroxynaphthalene-7-sulfonic acid. | 5-acetylamino-2-aminobenzoic acid → 2-(4'-hydroxy-3'-carboxyphenylamino)-5-hydroxynaphthalene-7-sulfonic acid (acid coupled). | Do. |

What we claim is:

1. A polyazo dyestuff capable of being coppered and corresponding, in the free state, to the formula

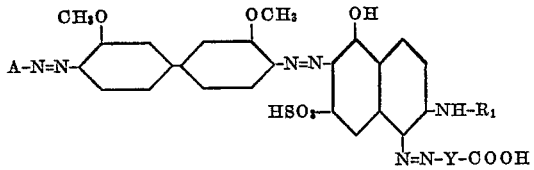

wherein R₁ means a member selected from the group consisting of alkyl, cycloalkyl, aralkyl and aryl radicals of the benzene series, Y means an aryl radical of the benzene series containing the carboxy group in ortho-position to the azo group, A being a member selected from the group consisting of ortho-hydroxycarboxylic acid radicals of the benzene and naphthalene series coupled in para-position to the hydroxy group and of hydroxynaphthalene radicals coupled in the ortho-position to the hydroxy group.

2. A polyazo dyestuff capable of being coppered and corresponding, in the free state, to the formula

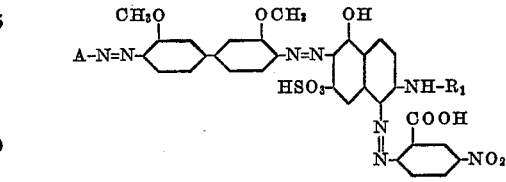

wherein R₁ means a member selected from the group consisting of alkyl, cycloalkyl, aralkyl and aryl radicals of the benzene series, A being a member selected from the group consisting of ortho-hydroxycarboxylic acid radicals of the benzene and naphthalene series coupled in para-position to the hydroxy group and of hydroxynaphthalene radicals coupled in the ortho-position to the hydroxy group.

3. The polyazo dyestuff capable of being coppered and corresponding, in the free state, to the formula

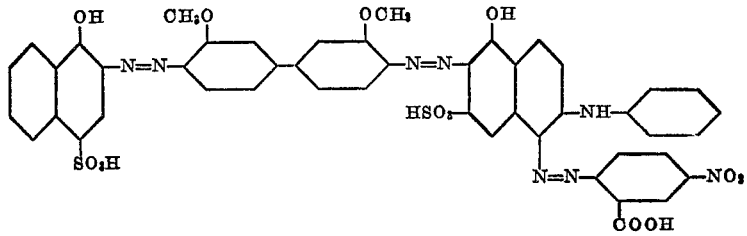

4. The polyazo dyestuff capable of being coppered and corresponding, in the free state, to the formula

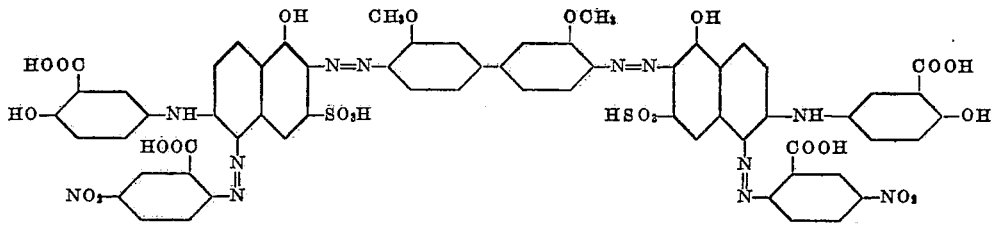

5. The polyazo dyestuff capable of being coppered and corresponding, in the free state, to the formula

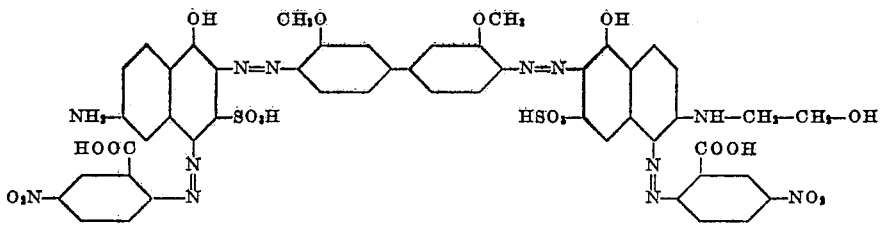

WERNER BOSSARD.
ERNST KELLER.

REFERENCES CITED

The following references are of record in the file of this patent:

UNITED STATES PATENTS

| Number | Name | Date |
|---|---|---|
| 1,901,387 | Wiedemann et al. | Mar. 14, 1933 |
| 2,243,020 | Straub et al. | May 20, 1941 |
| 2,268,935 | Hanhart | Jan. 6, 1942 |
| 2,277,262 | Stein et al. | Mar. 24, 1942 |
| 2,417,306 | Krebser et al. | Mar. 11, 1947 |

FOREIGN PATENTS

| Number | Country | Date |
|---|---|---|
| 474,331 | France | Nov. 21, 1914 |
| 818,154 | France | June 14, 1937 |
| 543,100 | Great Britain | Feb. 10, 1942 |